May 27, 1947.   E. M. DELORAINE ET AL   2,421,016
RADAR TESTING APPARATUS
Filed May 25, 1942
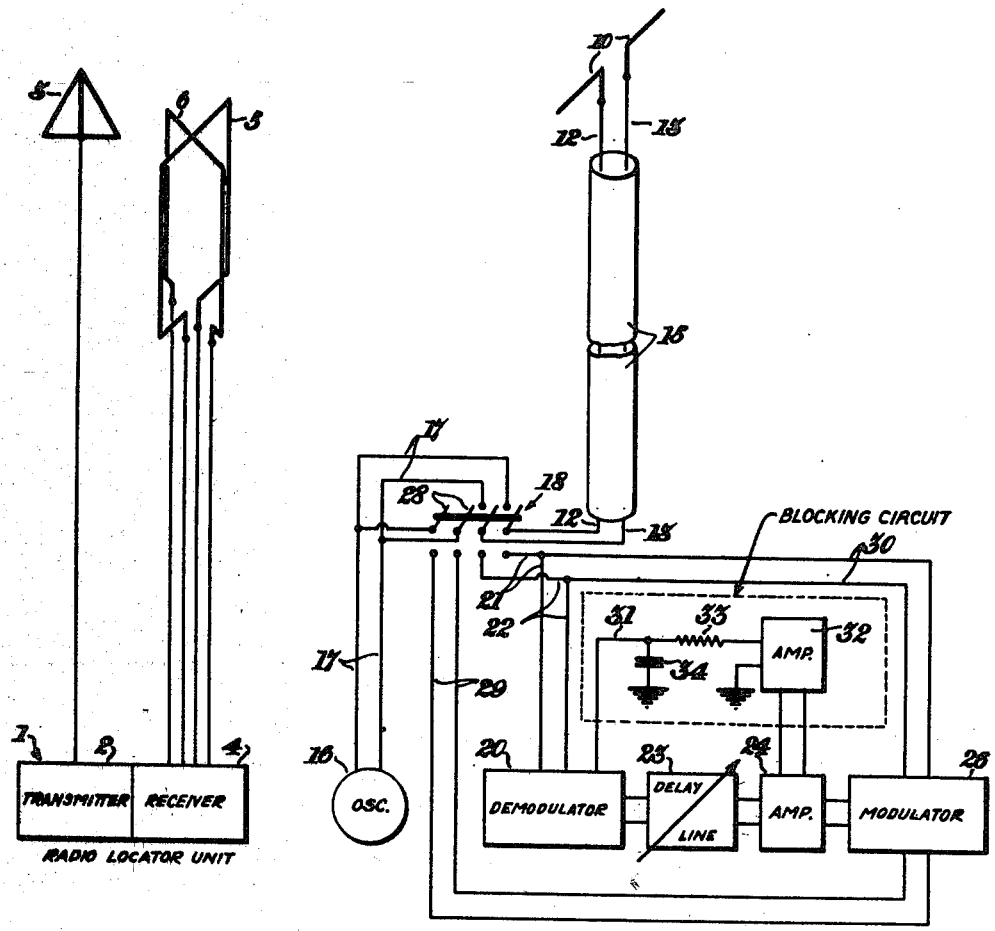
INVENTORS
EDMOND M. DELORAINE
EMILE LABIN
BY
ATTORNEY Patented May 27, 1947

2,421,016

UNITED STATES PATENT OFFICE 2,421,016

RADAR TESTING APPARATUS

Edmond M. Deloraine and Emile Labin, New York, N. Y., assignors to Federal Telephone and Radio Corporation, a corporation of Delaware Application May 25, 1942, Serial No. 444,362

8 Claims. (Cl. 250—1.50)

This invention relates to radio locating devices, and more particularly to apparatus and a method for testing the calibration of such devices.

Radio locator units using the "echo" principle have been proposed for use on warships to detect and locate objects such as ships, airplanes, etc. Such locator units, in order to be accurate must be periodically tuned and the calibration thereof tested. The tuning may be accomplished by using an oscillator of known frequency but in order to test the calibration of the unit, echoes of its broadcasted signals caused by an object such as a building, or a hill, or other fixed reflection surfaces, at known distances of one or more miles from the position of the locator are required. This method of checking and/or calibrating radio locator units is satisfactory where there are echo-responding objects at known distances from the site of the locator as in the case of anti-aircraft emplacements in and about a city, but where no fixed obstacles exist at suitable distances, as in the case of a locator on board a ship at sea, some other means for testing the calibration must be obtained.

One of the objects of this invention, therefore, is to provide apparatus and a method by which the calibration of radio locators can be tested for echo reception without requiring the presence of echo-responding objects at known distances from the locator.

Another object of this invention is to provide apparatus and a method for tuning the transmitter and/or receiver of a radio locator unit for operation at a desired frequency and to test the calibration of the receiver at such frequency.

Still another object of this invention is to provide apparatus for use adjacent the locator which is operable to produce in response to radio signals known distance echoing effects by which the calibration of the locator can be tested.

The method of this invention comprises first the generation of energy waves at a known frequency by which the transmitter and the receiver of the locator unit can be tuned, then the transmission of radio signals and the production in response thereto of a corresponding signal simulating an echo of the radio signal.

This echo simulating signal or "echo effect" is brought about by demodulating the radio signal transmitted by the unit, then delaying the modulating component thereof, generating an oscillating energy wave at the frequency of the carrier component of the radio signal and modulating the energy waves by the retarded modulating component. The resulting signal thus generated lags the signal of the unit by the amount the modulating component has been retarded, thereby producing an echo effect of known time interval. The delay feature of the testing apparatus may be varied for different time delays corresponding to different desired distances for which the calibration of the locator should be tested.

For a better understanding of the invention, reference may be had to the following detailed description of a form of apparatus by which the method of the invention may be carried out, to be read in connection with the accompanying drawing in which the sole figure is a schematical illustration of a radio locator unit and apparatus for tuning and testing the calibration of the unit in accordance with this invention.

A radio locator unit 1 is shown to comprise a transmitter 2 having a transmitting antenna 3, and a receiver 4 having loop antennae 5 and 6. The radio locator and antennae used therewith may be of any known construction using the "echo" principle of operation.

The apparatus for tuning the radio locator unit and testing the calibration thereof is shown to have a short antenna 10, the leads 12 and 13 of which may be passed through a suitable shield 15. Any suitable oscillator 16 operable to generate energy waves at a desired frequency may be connected through line 17 to the antenna 10 by a manually operable switch 18. Thus connected, the continuous oscillations of the oscillator 16 may be used to tune the transmitter 2 and the receiver 4 to the same frequency.

The apparatus further comprises a demodulator 20 adapted to receive radio signals over the antenna 10 after completion of a tuning operation. This is effected by changing the switch 18 to open the lines 17 and connect the antenna leads 12 and 13 to the input leads 21 and 22 of the demodulator 20. The demodulator 20 may be of any known construction such as the square-law detection type and includes a grid controlled tube (not shown) to be referred to hereinafter. The radio signal received from the antenna 3 of the transmitter 2 is demodulated to extract the modulating or envelope waveform thereof which has the form of a direct current impulse. This impulse is then passed through a delay line 23 which may be adjustable to change the time interval required for the impulse to pass therethrough. In place of a delay line there can be used an electronic delay apparatus (e. g., of the type shown in the copending U. S. application of Donald D. Grieg, Serial No. 435,498, filed March 20, 1942). Such apparatus essentially comprises a multivibrator arranged to be triggered from its normal stable state to its alternate unstable state by the application of a pulse to its input and adjusted so as to spontaneously return to its normal state after a predetermined time equal to the required delay. The square wave output of this multivibrator is twice differentiated by a pair of R.-C. differentiation circuits to yield a sharp negative needle pulse at the start of the square wave and a sharp positive needle-sharp pulse at the end of the square wave. The negative pulses are suppressed by a limiter device and the remaining needle-sharp positive pulses are delivered as "delayed pulses" at the output of the apparatus.

The delayed impulse is then amplified by passing it through a suitable amplifier 24. The amplified delayed impulse is then conducted to a modulator 26 where it is used as a modulating frequency for a carrier generated by the oscillator 16.

When the switch 18 is moved to connect the antenna 10 to the demodulator 20, the knives 28 thereof connect the output line 17 to input line 29 of the modulator 26. The oscillator 16 having previously been used to tune the locator unit will operate at the same frequency and the energy waves generated thereby may be used, as a carrier and the retarded impulse extracted from the radio signal is used to modulate the energy waves. This resulting modulated wave is applied to the antenna 10 through output line 30, leads 21, 22, switch 18 and leads 12, 13, and is thereby transmitted to loops 5, 6 for reception by the receiver 4 of the locator, the same as an echo of the original signal transmitted.

In order to temporarily block the demodulator (so that the latter shall not respond to the transmission of echo signals from modulator 26) a circuit 31 is provided through which the potential of the delayed impulse is applied as a strong negative bias to the circuit of the demodulator. The potential of the delayed impulse is first transposed in an amplifier 32, and then conducted as a negative potential through a suitable resistance 33 to the demodulator 20. A condenser 34 may be connected between the circuit 31 and ground whereby the blocking effect of the impulse is prolonged a sufficient time interval to safely cover the whole transmission of the echoing signal.

In operation, it is first desirable to operate the oscillator 16 to send a continuous oscillation at a frequency corresponding to the frequency at which the radio locator 1 is to be operated, the transmitter 2 and receiver 4 being tuned to this standard signal in known manner. When the tuning operation is completed, radio signals may then be transmitted in the usual manner. The switch 18 may now be reversed to connect the oscillator 16 to the modulator 26 and the leads 12, 13 to the leads 21, 22. The testing apparatus is now in condition to produce simulated echoes to radio signals from the transmitter 2. The radio signals are received over the antenna 10 and demodulated to produce a modulating impulse corresponding to the modulating wave form used in the circuit of the transmitter 2. This modulating impulse is then delayed by adjusting the delay line 23 for the desired delay interval corresponding to one, two, or more miles, whichever may be desired, and the resulting delayed modulating impulse, after having been amplified, is modulated upon the energy waves generated by the oscillator 16. Energy of the delayed impulse is passed through the amplifier 32 where the polarity thereof is changed to negative and the negative potential thereof impressed upon a biasing grid of the grid controlled tube of the demodulator 20. This blocks the passage of electrons from the filament to the plate of this tube for each signal transmitted from the modulator 26. The delayed signal of the testing apparatus is received on the loop antennae 5, 6 the same as an echo of the corresponding radio signal rebounding from an object at a distance from the locator corresponding to the setting of the delay line 23. If the calibration of the locator 1 is accurate, the time delay indication of the locator should correspond to the setting of the delay line 23. By varying the adjustment of the delay line 23, the calibration of the locator 1 may be checked for several distances.

From the foregoing description, it will be readily apparent that the testing apparatus and method of this invention is particularly useful for tuning and testing radio locators on board ships at sea. The testing apparatus may be located in the same room with the radio locator unit and the antenna 10 may be mounted on a part of the ship a short distance from the antennae 3, 5 and 6 of the unit.

While only one form of apparatus has been shown and described for carrying out the method, it is recognized that many variations and selection of parts may be made without departing from the invention. It is to be understood, therefore, that the form shown and described is illustrative of the invention only and not to be taken as restricting the appended claims.

What we claim is:

1. Testing apparatus for checking the calibration of a radio locator unit of the character used for transmission of radio signals and for the reception of echoes produced by obstacles reflecting such signals comprising means to demodulate a radio signal transmitted by said unit, means to retard the modulating component of the signal by a predetermined amount, means to generate energy waves at the frequency of the radio signal, means to modulate said energy wave by using the retarded modulating component of the signal thereby producing a predetermined echo effect for reception by the locator unit, and means utilizing said retarded modulating component to block the demodulating means during the production of the echo effect.

2. Testing apparatus for checking the calibration of a radio locator unit of the character used for transmission of radio signals and for the reception of echoes produced by obstacles reflecting such signals comprising an oscillator operable to generate energy waves at a desired frequency to which the transmitter and receiver portions of the unit can be tuned, means to demodulate a radio signal transmitted by said unit, means to retard the modulating component of the signal by a predetermined amount, means to modulate energy waves generated by said oscillator by the retarded modulating component of the signal and thereby produce a predetermined echo effect for reception by the locator unit, and means utilizing the potential of said retarded modulating component to block the demodulating means during the production of the echo effect.

3. Testing apparatus for checking the calibration of a radio locator unit of the character used for transmission of radio signals and for the reception of echoes produced by obstacles reflecting such signals comprising an antenna, an oscillator operable to transmit energy waves at a desired frequency over said antenna to which the locator unit can be tuned, echo-producing means operable in cooperation with said oscillator to produce predetermined echo effects in response to radio signals transmitted by said unit, and means to alternately connect at will said oscillator to said antenna and to said echo producing means.

4. Testing apparatus for checking the calibration of a radio locator unit of the character used for transmission of radio signals and for the reception of echoes produced by obstacles reflecting such signals comprising an antenna, an oscillator operable to transmit energy waves at a desired frequency over said antenna to which the locator unit can be tuned, means for producing echo effects comprising a demodulator, a delay line and a modulator by which the modulating component of a radio signal may be segregated, delayed and reused as a modulating impulse in said modulator, means to connect said antenna to the input of said demodulator and to the output of said modulator, means to connect said oscillator to said modulator whereby the energy waves of said oscillator are modulated by said modulating impulse to produce a simulated echo signal, and means to block reception by said demodulator during transmission of the simulated echo signal from said antenna.

5. The method of testing the calibration of a radio locator unit of the character used for transmission of radio signals and for the reception of echoes produced by obstacles reflecting such signals comprising operating the unit to transmit a radio signal, demodulating the signal in the vicinity of the unit, retarding by a predetermined amount the modulating component of the signal, generating an energy wave at the frequency of the carrier component of the signal, modulating the energy wave by the retarded modulating component of the signal to produce a predetermined echo effect for reception by the locator unit and calibrating the locator unit according to the predetermined retardation of the echo effect.

6. The method of testing the calibration of a radio locator unit of the character used for transmission of radio signals and for the reception of echoes produced by obstacles reflecting such signals comprising operating the unit to transmit a radio signal, demodulating the signal in the vicinity of the unit, retarding by a predetermined amount the modulating component of the signal, generating an energy wave at the frequency of the carrier component of the signal, modulating the energy wave by the retarded modulating component of the signal to produce a predetermined echo effect for reception by the locator unit, inhibiting demodulation of said radio signals during modulation of said energy waves, and transmitting for reception by said unit the energy wave modulated by said retarded component.

7. The method of testing the calibration of a radio locator unit of the character used for transmission of radio signals and for the reception of echoes produced by obstacles reflecting such signals comprising tuning the unit by generating oscillating energy waves at a desired frequency in the vicinity of the unit, operating the unit to transmit a radio signal, demodulating the signal, retarding by a predetermined amount the modulating component of the signal, modulating the generated energy waves by the retarded modulating component of the signal to produce predetermined echo effects for reception by the locator unit, and calibrating the locator unit according to the predetermined retardation of the echo effect.

8. Means for checking the calibration of a radio locator unit comprising, in combination, an oscillator and a relay station, said oscillator and relay station being constructed as a relatively compact assembly for location in the vicinity of said radio locator unit so that the transit time of radio energy between said locator unit and said assembly will be negligible in comparison with the transit time of radio energy between said locator unit and distant objects within the range thereof, means for producing from said oscillator energy waves at a desired frequency to which said locator unit may be tuned, means for receiving at said relay station a signal transmitted by said locator unit, means for delaying the modulating component of the received signal, means for modulating said oscillator energy waves with said delayed modulating component of the received signal, and switching means to selectively control the application to said locator unit of said oscillator energy waves with and without signal modulation.

EDMOND M. DELORAINE.
EMILE LABIN.

REFERENCES CITED

The following references are of record in the file of this patent:

UNITED STATES PATENTS

| Number | Name | Date |
| --- | --- | --- |
| 1,452,957 | Colpitts | Apr. 24, 1923 |
| 1,849,884 | Peterson | Mar. 15, 1932 |
| 2,134,716 | Gun | Nov. 1, 1938 |